Sept. 23, 1947.    J. N. GLADDEN    2,427,669
MASTER CYLINDER
Filed July 25, 1942
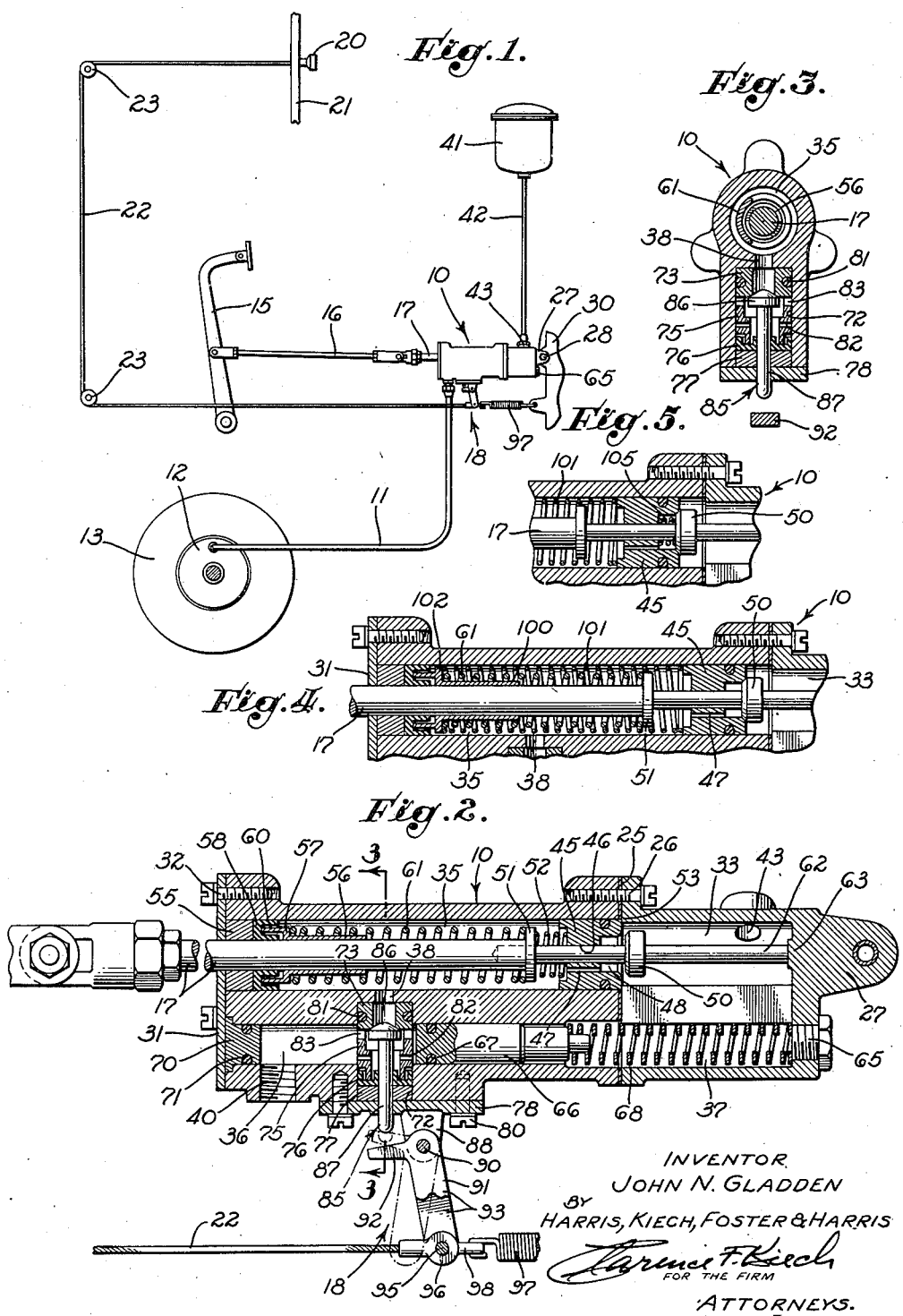
INVENTOR
JOHN N. GLADDEN
BY
HARRIS, KIECH, FOSTER & HARRIS
Clarence F. Kiech
FOR THE FIRM
ATTORNEYS.

Patented Sept. 23, 1947

2,427,669

UNITED STATES PATENT OFFICE 2,427,669

MASTER CYLINDER

John N. Gladden, Glendale, Calif.

Application July 25, 1942, Serial No. 452,336

7 Claims. (Cl. 60—54.6)

My invention relates to fluid-pressure systems for controlling and actuating various devices. While the invention may be used for various purposes in various fields, it is especially applicable to the control of devices on vehicles or aircraft by means of a fluid medium. By way of illustration, the invention will be described herein as embodied in a hydraulic brake system.

In a hydraulic brake system of the present type or in any similar system for transmitting force by pressure in a confined liquid body, the pressure is created in a power chamber or cylinder by a movable wall, such as a piston or diaphragm, and some provision is made for compensating flow to and from the liquid body. Compensating flow to the liquid body is required when liquid escapes from the system by leakage or when the liquid body contracts with dropping temperature, and, on the other hand, compensating flow from the liquid body is necessary whenever thermal expansion of the liquid body occurs.

In a common arrangement of power cylinder and piston, provision is made for automatically placing the power cylinder in free communication with a liquid reservoir whenever the piston is fully retracted to release the confined liquid body from force-transmitting pressure, such communication being cut off automatically whenever the piston is subsequently advanced.

The specific problem to which my invention refers arises from the use of a passage through the piston or other movable wall for providing communication between the power cylinder and the liquid reservoir. The problem is to keep the passage closed whenever the piston is in its range of pressure-applying positions. The problem is of utmost importance because liquid flow through the piston in an emergency situation may prove fatal.

The valve employed for controlling the piston passage may be operated either by fluid pressure alone and/or by relative movement between the piston and the associated piston rod. Normally, either arrangement is effective and reliable, but either arrangement may usually be so manipulated in an abnormal manner as to fail of its purpose. For example, it has been discovered that a pilot in the course of landing or taking off may oscillate or "jiggle" the foot pedal of a conventional airplane hydraulic brake system in such manner as to open the piston passage intermittently for progressive liquid transfer to the brake-fluid reservoir. The rapid movements of the brake pedal momentarily, but repeatedly, create valve-opening forces that normally occur only when the pedal is fully retracted. When such action is continued for even a short period, the brake pedal may creep toward its limit position with substantially no liquid pressure in the power cylinder ahead of the piston, and the whole system then may become inoperative. The system may be restored to effectiveness by completely retracting the brake pedal, but such a corrective procedure may not be obvious under the stress of an emergency and, if obvious, the additional time required may be such as to cause an accident.

The general object of the present invention is to remedy this defect in the type of hydraulic system that employs a passage through the movable wall of a power chamber for compensating flow to and from a liquid reservoir. In general, my invention is characterized by the concept that the required dependability may be achieved by employing yielding means continuously tending to close the piston passage, the yielding means providing such force as to preclude opening of the piston passage by any abnormal movements of the brake pedal. More specific objects of the invention will be apparent in my following detailed description, taken with the accompanying drawing.

In the drawing, which is to be considered as illustrative only:

Fig. 1 is a diagrammatic view of a brake system embodying my invention;

Fig. 2 is a longitudinal section through a master cylinder in the system;

Fig. 3 is a transverse section taken as indicated by the line 3—3 of Fig. 2;

Fig. 4 is a fragmentary view similar to Fig. 2, showing a modification of the structure; and Fig. 5 is a similar view showing a second modification.

Fig. 1 shows the principal parts of the illustrative system including: a master cylinder 10; a conduit 11 to a brake mechanism 12 for controlling a wheel 13; a brake pedal 15 operatively connected by a link 16 to a piston rod 17; a brake-latching mechanism generally designated 18; and a pull knob 20 that is mounted on a panel 21 and is connected to the brake-latching mechanism by a suitable cable 22 passing around pulleys 23.

The master cylinder 10 may be made in two sections with an intervening gasket 25, the two sections being held together by suitable screws 26. One end of the master cylinder may be provided with an ear or bracket 27 so that the master cylinder may be pivotally mounted by a bolt 28 on a fixed part 30 of the vehicle or aircraft. The opposite end of the master cylinder 10 into which the piston rod 17 extends may be provided with and end plate 31 held in place by suitable screws 32. The interior of the master cylinder is bored longitudinally to provide a reservoir chamber 33, a power chamber or cylinder 35, a passage 36 for receiving pressure from the power cylinder, and an accumulator 37 communicating with the passage 36. Fluid flows between the power cylinder 35 and the passage 36 through a port 38 and flows between the passage 36 and the conduit 11 through a threaded port 40.

Since the master cylinder 10 is shown in approximately horizontal position in Fig. 1, it is advisable to provide an auxiliary fluid reservoir in the form of a tank 41 that is connected by a supply pipe 42 to an inlet port 43 of the reservoir 33 or to an orifice of the plug 65 to be later described. However, if the normal position of the installed master cylinder 10 places the reservoir chamber 33 substantially higher than the power cylinder 35, the tank 41 and the supply pipe 42 may be omitted and the inlet port 43 closed with a suitable vented plug.

Slidingly mounted in the power cylinder 35 is a suitable piston 45 having a bore 46 that slidingly receives the piston rod 17. The piston 45 is provided with a suitable passage therethrough for fluid flow between the reservoir 33 and the power cylinder 35, and such a passage may be provided by simply making the bore 46 oversize relative to the piston rod. In the present construction the passage is provided by a small longitudinal bore 47 leading to a circular recess 48 on the outer face of the piston, the recess being suitably beveled at its rim to serve as a valve seat for a valve member 50 carried by the piston rod 17. The piston 45 has a restricted range of movement relative to the piston rod 17 as determined on one side by the valve member 50 and on the opposite side by a radial flange 51 on the piston rod 17.

At the heart of the present invention is the concept of employing suitable yielding means to continuously urge the piston 45 and the valve member 50 together to close the piston passage. In Fig. 2, by way of example, I show a helical spring 52 in compression between the radial flange 51 and the piston 45 to urge the piston toward the valve member 50. In the normal ineffective position of the piston indicated in Fig. 2, the piston is held out of engagement with the valve member 50 by a suitable stop means. In the construction shown, the stop means is an annular shoulder 53 which is formed by making the inner diameter of the reservoir 33 smaller than the inner diameter of the power cylinder 35.

The piston rod 17 passes through an annular body 55 abutting the end plate 31 and is surrounded by a tubular member 56 formed with an annular shoulder 57. Abutting the inner face of the tubular member 56 is a packing ring 58 of U-shaped cross section into which seats an annular skirt 60 integral with the tubular member 56. Also surrounding the piston rod 17 is a suitable helical spring 61 that acts between the annular shoulder 57 of the tubular member 56 and the previously mentioned radial flange 51. It is apparent that the spring 61 has two functions, namely, the function of keeping the packing ring 58 in place and the function of continuously urging the piston rod 17 toward the reservoir 33. The spring 61 is preferably, but not necessarily, considerably stronger than the spring 52.

The limit position to which the spring 61 tends to move the piston rod 17 may be determined by the radial flange 51 together with the spring 52, but in the preferred construction shown in the drawing I provide other means for limiting the spring-actuated movement of the piston. Thus, Fig. 2 shows an extended portion 62 of the piston rod 17 abutting the end wall 63 of the reservoir 33.

The accumulator chamber 37, which is closed by a suitable plug 65, contains a piston 66 carrying a packing ring 67 and houses a suitable helical spring 68 that continuously urges the piston toward the passage 36.

At one end of the passage 36 is a suitable plug 70 embraced by a packing ring 71 and held in place by the previously mentioned end plate 31. Intersecting the passage 36 is a lateral bore 72 leading to the power cylinder port 38, the purpose of the lateral bore being to house a suitable valve for cutting off communication between the power cylinder 35 and the passage 36 when it is desired to latch or lock the brakes hydraulically. As shown in Figs. 2 and 3, the lateral bore 72 contains a valve cage assembly comprising an annular valve seat member 73, a valve cylinder 75, a packing ring 76, and an annular body 77, this assembly being held in place by a retaining plate 78 that is anchored to the master cylinder by suitable screws 80. The valve seat member 73 provides the upper section of a passage, enlarged within the cylinder 75, opening on the port 38. This member 73 may be made of suitable fibrous material and may be embraced by a suitable packing ring 81. The valve cylinder 75 is bored radially to provide suitable ports 82 for communication with the accumulator chamber 37 and to provide other ports 83, these other ports 83 being in effect part of the passage 36. In fact, the whole interior of the valve cage is in effect part of the passage 36. The packing ring 76 is preferably U-shaped in cross section and serves to seat the end of the valve cylinder 75 as shown.

Mounted in the described valve cage assembly is a valve member generally designated 85 having a flanged head 86 and an axial stem 87, the stem extending through the cage assembly and the retaining plate 78 to the exterior of the master cylinder 10. Preferably, the valve member 85 is of highly polished metal to facilitate axial movement of the stem 87 through the packing ring 76 without significant leakage.

When the valve member 85 is seated as shown in Figs. 2 and 3, the face of the valve head 86 is in large part exposed to fluid pressure from the power cylinder 35, while the under side of the valve head provides an annular surface exposed in an opposing manner to pressure prevailing in the passage 36. It will be apparent that whether or not the valve member 85 remains in the closed position depends upon the relative pressures involved and the corresponding relative areas. The valve member will remain seated as long as pressure from the passage 36 predominates over pressure from the power cylinder 35, but will unseat the moment that pressure from the power cylinder predominates.

Once the valve member 85 is unseated and thereby moved to an intermediate position, the whole of the flanged head 86 is acted upon by the surrounding fluid, and it will be apparent that the extension of the valve stem 87 into the atmosphere results in a pressure differential to urge the valve member with a snap action to a maximum open position with the valve head abutting against a shoulder at the lower end of the enlarged passage provided by the valve cylinder 75. In other words, the valve provides differential areas for response to the surrounding pressure of the surrounding fluid, the face of the valve head being greater in area than the under side of the valve head. The surrounding pressure is usually relatively high and may approach 700 lbs. per sq. in. or higher.

The latching mechanism 13 has the function of mechanically restoring the valve member 85 to its seated position and may be of any suitable construction. In the arrangement shown, the bottom retaining plate 78 on the master cylinder provides a bracket 88 for a cross pin 90, and a suitable bell-crank 91 is pivotally mounted on the cross pin. One arm 92 of the bell-crank is a contact member movable against the end of the valve stem 87 to force the valve member to seated position, and the other arm 93 of the bell-crank, which comprises two parallel members, is pivotally connected by a pin 95 to a suitable fitting 96 for connection with the previously mentioned cable 22. Preferably, yielding means is provided to hold the bell-crank 91, the cable 22, and the pull knob 20 in the normal positions shown in Fig. 1. Such a yielding means may comprise a suitable spring 97 anchored at one end to the previously mentioned fixed parts 30 of the vehicle or aircraft, and attached at the other end to an ear 98 on the fitting 96.

The manner in which the described brake system functions may be readily understood. Normally, the valve member 85 is in maximum open position so that pressure in the passage 36 leading to the individual brake mechanisms corresponds to pressure in the power cylinder 35, and is determined by the extent to which leftward movement of the piston 45 causes the accumulator piston 66 to be displaced in opposition to the spring 68. Under such conditions of free flow between the power cylinder 35 and the passage 36, pressure in the brake system responds instantaneously to movements of the brake pedal 15. When the brake pedal 15 is in its normal released position, the piston 45 is pressed against the annular stop shoulder 53 by the small spring 52, and fluid may flow freely through the piston passage 47 between the reservoir 33 and the power chamber 35. At such time fluid may flow from the reservoir 33 into the power cylinder to compensate for leakage from the system or to compensate for thermal contraction of the fluid in the system. On the other hand, the flow may be from the power cylinder to the reservoir 33 to compensate for thermal expansion of the fluid in the system.

Whenever it is desirable to lock the brakes for parking while the piston 45 is in an advanced position with the accumulator piston 66 displaced against the pressure of the spring 68, the operator or pilot pulls on the knob 20 to move the valve member 85 to closed position, and, while the valve member is held seated, releases the brake pedal 15 to lower the pressure in the power cylinder 35. Lowering of the pressure in the power chamber causes the pressure in the passage 36 to predominate and hold the valve member 85 in seated position. When the brake pedal is released, the spring 61 causes the piston rod 17 to move toward the reservoir 33. Fig. 2 shows the positions of the various parts in brake-locking relationship and at the end of the spring-actuated movement of the piston rod 17 after the knob 20 has been pulled and released. It will be noted that the piston 45 is cut off from the pressure of the system and is spaced from the valve member 50 to permit flow through the piston.

Whenever the operator or pilot desires to unlatch the brakes, he merely presses quickly against the brake pedal 15 to cause an abrupt pressure rise in the power cylinder 35 to unseat the valve member 85, whereupon the valve member 85 snaps open to release pressure in the system, the brake pedal being released, of course, to permit the desired drop in pressure in the whole system.

Whenever the piston rod 17 is moved out of the normal position shown in Fig. 2, the valve member 50 initially moves into sealing relation with the piston 45, and such a sealing relation is maintained throughout the range of pressure positions of the piston. The spring 52 exerts sufficient pressure to prevent opening of the piston passage 47 regardless of any abrupt movements or rapid reciprocations of the piston rod 17 while brake-applying pressure exists in the system.

Fig. 4 indicates the construction of a modified form of my invention that is largely identical to the above described form as indicated by the use of corresponding numerals. The construction shown in Fig. 4 differs from the construction shown in Fig. 2 in the substitution of a tubular member 100 for the tubular member 56 and in the substitution of a relatively long spring 101 for the previously described small spring 52. The tubular member 100 provides a radially extensive shoulder 102 to seat not only the end of the previously described spring 61 for the piston rod 17, but also the end of the spring 101 for urging the piston 45 against the valve member 50.

Fig. 5 shows a further modification in which two springs are employed, one spring being the spring 101 of Fig. 4, and the second spring being a small spring 105 that acts in compression between the piston 45 and the valve head 50. The spring 101 retains the valve head 50 in closed position against the piston 45 during all movements of the piston, and the spring 105, which is weaker than the spring 101, insures the movement of the valve head 50 to open position when the piston 45 is in its normal ineffective position.

In the preferred practice of my invention I employ the described latching means for cutting off the power chamber from the fluid passages to the individual brakes. Since the invention claimed herein is concerned primarily with the power chamber, however, it is apparent that any type of fluid-transmitting arrangement with or without any such latching means may be employed in various practices of the invention.

The above description in specific detail of preferred embodiments of my invention, given for the purpose of disclosure and to illustrate the principles involved, will suggest to those skilled in the art various changes and substitutions based on my concept, and I reserve the right to all such departures from the description that lie within the scope of my appended claims.

I claim as my invention:

1. In a system of the character described having a pressure-receiving passage, the combination of: a fluid reservoir; a power cylinder having a first port communicating with said pressure-receiving passage and a second port communicating with said reservoir; a movable wall in said cylinder movable from a normal position toward said first port to create pressure in said passage, said movable wall being provided with a passage therethrough; actuating means for said wall having a lost-motion connection with the wall to permit a limited range of relative movement between the wall and the actuating means, said actuating means being movable from a normal position toward said first port; valve means to seal said wall passage when the actuating means moves against said wall at the limit of said range of relative movement in the direction of said first port; resilient means positioned between said actuating means and said movable wall and adapted for urging relative movement of said wall to close said passage by said valve means; resilient means in said cylinder stronger than the first mentioned resilient means and adapted for urging said valve means into open position; and a stop to limit the movement of said wall at said normal wall position in opposition to said first resilient means, said normal positions of the wall and the actuating means being located to open said valve means for flow between said power cylinder and said reservoir through said wall passage.

2. In a system of the character described having a pressure-receiving passage, the combination of: a fluid reservoir chamber; a power cylinder chamber having a first port communicating with said pressure-receiving passage and a second port communicating with said reservoir chamber; a piston in said cylinder chamber movable toward said first port to create pressure in said passage, said piston having a passage therethrough; an actuating member in said cylinder chamber movable relative to said piston, said actuating member being adapted to engage the piston and force the piston toward said first port, said actuating member having a normal limit position relative to said cylinder chamber; normally open valve means to close said piston passage in response to engagement of the piston by the actuating member; a first resilient means urging said piston into engagement with said actuating member; a second resilient means in one of said chambers stronger than said first resilient means and adapted for resisting movement of said actuating member from its normal position, the resistance to deformation of said first resilient means being of such value as to retain said valve means in closed position during all movements of said piston; and stop means to limit movement of said piston in opposition to said first resilient means at a normal position located relative to the normal position of the actuating member to hold the piston out of engagement with the actuating member, thereby normally to permit fluid flow between said cylinder chamber and said reservoir chamber through said piston passage.

3. In a system of the character described having a pressure-receiving passage, the combination of: a fluid reservoir chamber; a power cylinder chamber having a first port communicating with said pressure-receiving passage and a second port communicating with said reservoir chamber; a piston in said cylinder chamber movable toward said first port to create pressure in said passage, said piston having a passage therethrough; an actuating member in said cylinder chamber movable relative to said piston, said actuating member being adapted to engage the piston and force the piston toward said first port, said actuating member having a normal limit position relative to said cylinder chamber; normally open valve means to close said piston passage in response to engagement of the piston by the actuating member; a first spring around said actuating member in one of said chambers and adapted for urging said piston into engagement with said actuating member; a second spring around said actuating member in one of said chambers stronger than said first spring and adapted for resisting movement of said actuating member from its normal position, the resistance to deformation of said first spring being of such value as to retain said valve means in closed position during all movements of said piston; and stop means to limit movement of said piston in opposition to said first spring at a normal position located relative to the normal position of the actuating member to hold the piston out of engagement with the actuating member, thereby normally to permit fluid flow between said cylinder chamber and said reservoir chamber through said piston passage.

4. In a system of the character described having a pressure-receiving passage, the combination of: a fluid reservoir; a power cylinder having a first port communicating with said pressure-receiving passage and a second port communicating with said reservoir; a piston in said cylinder movable toward said first port to create pressure in said passage, said piston having a passage therethrough; an actuating member in said cylinder movable relative to said piston, said actuating member being adapted to engage the piston and force the piston toward said first port, said actuating member having a normal limit position relative to said cylinder; normally open valve means adapted for closing said piston passage in response to engagement of the piston with the actuating member; a first spring around said actuating member in said cylinder and adapted for urging said piston into engagement with said actuating member, said first spring being compressed when said piston is out of engagement with said actuating member; a second spring around said actuating member in said cylinder stronger than said first spring and adapted for resisting movement of said actuating member from its normal position, the resistance to deformation of said first spring being of such value as to retain said valve means in closed position during all movements of said piston; and stop means to limit movement of said piston in opposition to said first spring at a normal position located relative to the normal position of the actuating member to hold the piston out of engagement with the actuating member, thereby normally to permit fluid flow between said cylinder and said reservoir through said piston passage.

5. In a system of the character described having a pressure-receiving passage, the combination of: a chamber providing a fluid reservoir, and a power cylinder having a first port communicating with said pressure-receiving passage and a second port communicating with said reservoir; a movable wall in said cylinder movable from a normal position toward said first port to create pressure in said passage, said movable wall being provided with a passage therethrough; actuating means in said chamber adapted to move said movable wall toward said first port and having a limited range of movement relative to said wall; normally open valve means adapted to be moved into engagement with said movable wall to close said passage in said wall at the limit of said range of movement of the actuating means relative to said movable wall; resilient means disposed in said chamber and including means between said movable wall and one wall of said chamber resisting movement of said wall toward said first port, said resilient means including means tending to move said valve means to open the passage through said movable wall; and stop means to limit the movement of said wall in opposition to the resilient means resisting its movement toward said first port and providing a normal position for said movable wall, said valve means being in a normal open position to open said passage through said movable wall when said wall is in its normal position, thereby establishing flow between said power cylinder and said reservoir through said wall passage when said wall and said valve means are in normal position.

6. A combination according to claim 5 wherein a sliding engagement is provided between said actuating means and said movable wall forming a lost motion connection to permit said limited range of relative movement.

7. In a system of the character described having a pressure-receiving passage, the combination of: a fluid reservoir; a power cylinder having a first port communicating with said pressure-receiving passage and a second port communicating with said reservoir; a movable wall in said cylinder movable from a normal position toward said first port to create pressure in said passage, said movable wall being provided with a passage therethrough; actuating means extending into said power cylinder and having a lost-motion connection with said wall to permit a limited range of relative movement between said wall and said actuating means, said actuating means being movable from a normal position toward said first port; valve means to seal said wall passage when said actuating means moves against said wall at the limit of said range of relative movement in the direction of said first port; spring means surrounding the portion of said actuating means extending into said power cylinder and positioned between a fixed portion of said power cylinder and said movable wall and adapted for urging relative movement of said wall to close said wall passage by said valve means; and a stop to limit the movement of said wall at said normal wall position in opposition to said spring means, said normal positions of said wall and said actuating means being located to open said valve means for flow between said power cylinder and said reservoir through said wall passage.

JOHN N. GLADDEN.

REFERENCES CITED

The following references are of record in the file of this patent:

UNITED STATES PATENTS

| Number | Name | Date |
|---|---|---|
| 2,136,835 | Begg | Nov. 15, 1938 |
| 2,152,499 | Rasmussen | Mar. 28, 1939 |
| 2,205,806 | Belenkij | June 25, 1940 |
| 2,231,294 | Queen | Feb. 11, 1941 |
| 2,258,798 | Patrick | Oct. 14, 1941 |
| 2,289,563 | Wood | July 14, 1942 |
| 2,038,898 | Goodyear | Apr. 28, 1936 |
| 2,020,465 | Hall | Nov. 12, 1935 |
| 2,120,073 | Majneri | June 7, 1938 |
| 2,242,096 | Thomas | May 13, 1941 |
| 2,092,251 | Heidloff | Sept. 7, 1937 |
| 2,356,517 | Hale | Aug. 22, 1944 |
| 2,301,037 | Greene | Nov. 3, 1942 |
| 2,322,062 | Schnell | June 15, 1943 |

FOREIGN PATENTS

| Number | Country | Date |
|---|---|---|
| 378,992 | Great Britain | June 15, 1943 |
| 812,483 | France | Feb. 1, 1937 |